May 16, 1961  R. O. PETERSON  2,984,053
BRUSH AND BRUSH MATERIAL
Filed July 14, 1951  3 Sheets-Sheet 1
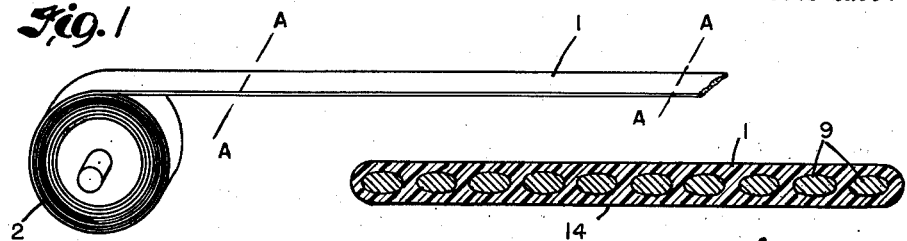
Fig. 1
Fig. 2
Fig. 3
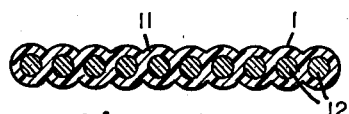
Fig. 4
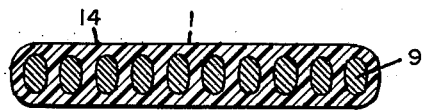
Fig. 5
Fig. 6
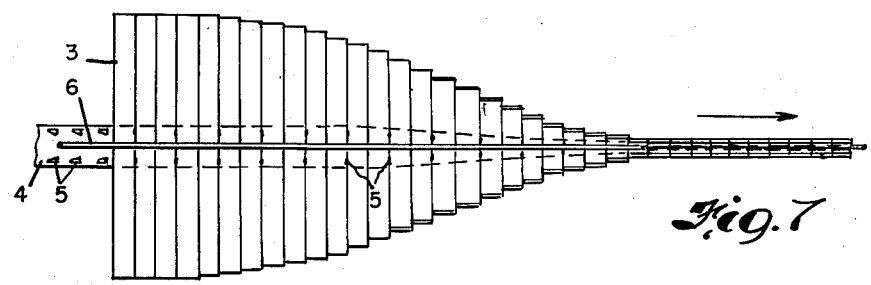
Fig. 7
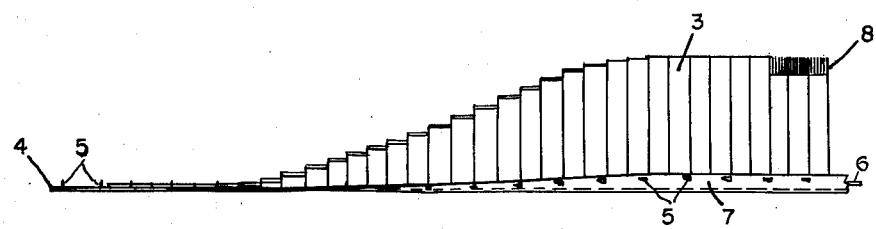
Fig. 8
INVENTOR.
RUBEN O. PETERSON
BY
Oberlin & Limbach
ATTORNEYS.

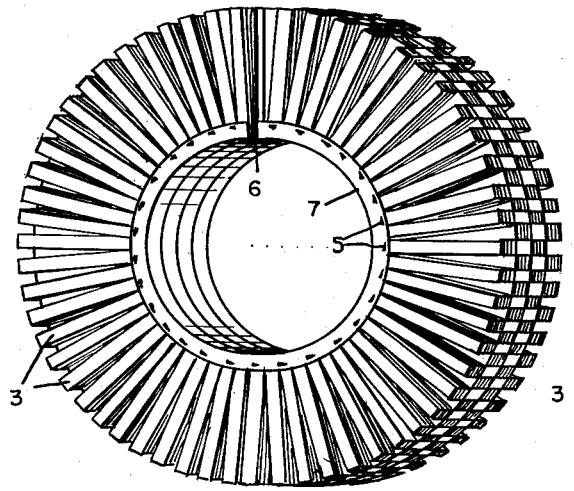
Fig. 9
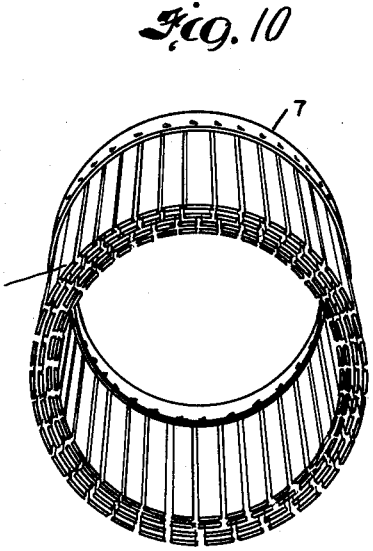
Fig. 10
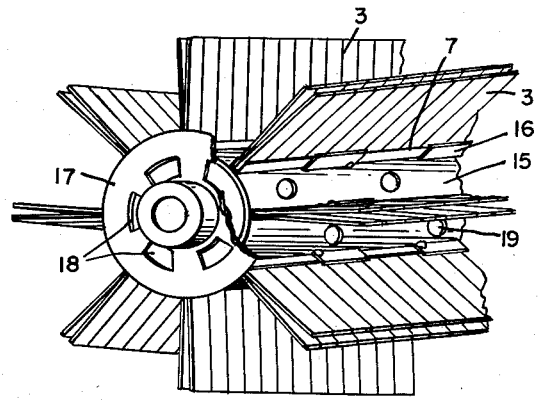
Fig. 11
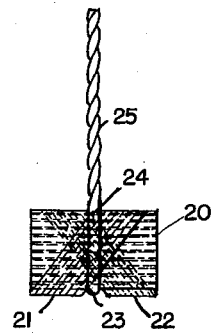
Fig. 12
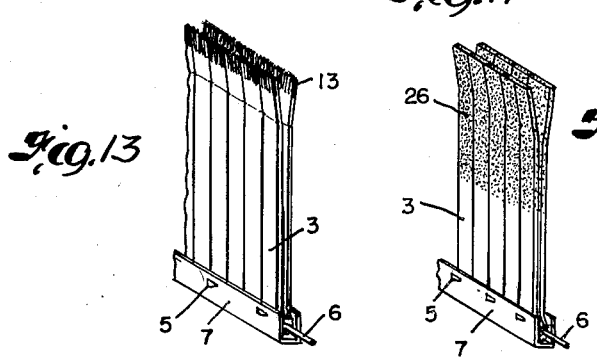
Fig. 13
Fig. 14
INVENTOR.
RUBEN O. PETERSON
BY
ATTORNEYS.

May 16, 1961    R. O. PETERSON    2,984,053
BRUSH AND BRUSH MATERIAL
Filed July 14, 1951    3 Sheets-Sheet 3
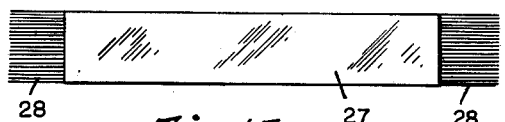
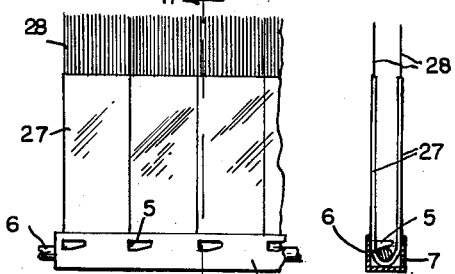
Fig.15   Fig.18   Fig.16   Fig.17
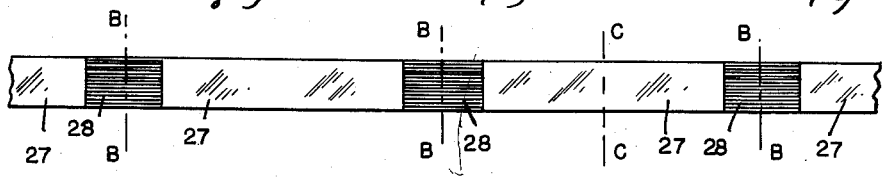
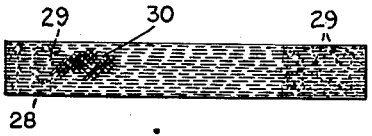
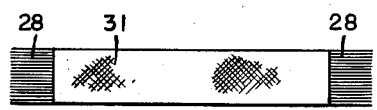
Fig.19   Fig.20
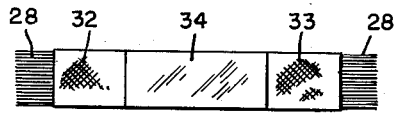
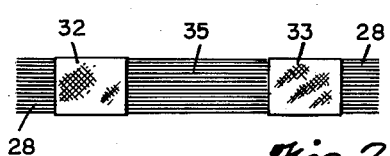
Fig.21   Fig.22   Fig.23
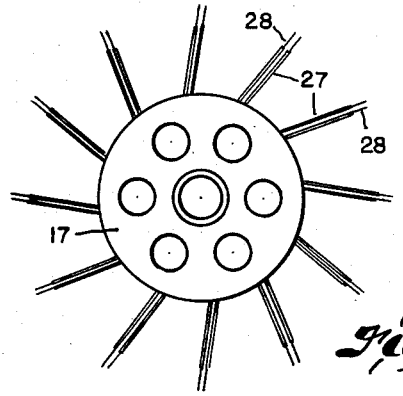
Fig.24
INVENTOR.
RUBEN O. PETERSON
BY
Oberlin & Limbach
ATTORNEYS, United States Patent Office 2,984,053
Patented May 16, 1961

2,984,053
BRUSH AND BRUSH MATERIAL
Ruben O. Peterson, University Heights, Ohio, assignor to The Osborn Manufacturing Company, Cleveland, Ohio, a corporation of Ohio
Filed July 14, 1951, Ser. No. 236,755
28 Claims. (Cl. 51—193.5)

This invention relates as indicated to a novel brush and brush material, and more particularly to a method of preparing and utilizing filamentous bristle material in brushes.

In my prior Patent No. 2,303,386 I disclose a method of manufacturing brush strip wherein bristle material is laid transversely of a continuous metal backing strip and overlaid with a retaining wire so that when such strip is thereafter formed to channel shape, the bristle material will be doubled about such retaining wire and secured in the resultant channelform back. Teeth will desirably be punched in from the sides of the strip forming such channel to engage and hold such wire in place. Other methods of forming brush strip and of securing bristle material in channel supports are also known in the art and commercially practiced. In all methods of brush manufacture utilizing relatively short lengths of bristle material such as, for example, horsehair, Tampico fiber, wire, nylon and the like, a considerable problem is encountered in handling such bristle material as numerous light and easily displace filaments both to secure a uniform and desired density, spacing, and orientation of fill and also adequate gripping of bristles and uniform bristle length in the finished brush before or without trimming. Such problem is encountered whether mechanical devices are utilized to feed the bristle material to a continuous brush strip forming machine, for example, or whether such bristle material is fed by hand. Not infrequently considerable lengths of brush strip must be rejected and scrapped because of such non-uniformity, and in practically all cases it is conventional practice to trim the finished brushes to proper bristle length after manufacture, with consequential cost and waste of the trimmed material. It is particularly difficult to handle very short lengths of bristle when manufacturing short trim brushes, i.e. brushes of very short bristle length, and the percentage of waste is especially large in such cases.

Wire of oval or rectangular cross-section may desirably be employed in certain types of brushes and larger sizes of wires may be utilized when arranged to flex transversely of their narrower dimensions, having substantially the same flexibility in this direction as round wire of an equal diameter. This is advantageous in that such round wire is relatively more expensive due to the necessity of further drawing operations to reduce it to such specified diameter, but it has proven extremely difficult to maintain such flat or oval wire properly oriented in this regard. Similarly, such flat or oval wire may be secured in a rotary brush back, for example, with its greater transverse section extending in the direction of rotation of the brush, thereby affording a relatively stiff or sharp brushing action. Again, however, much difficulty is encountered in thus orienting the individual filaments, particularly when they are of relatively small cross-section.

It is frequently desired to adhere granular abrasive materials such as emery, for example, to brush filaments of relatively small diameter, but it has been found difficult to secure such abrasive granules at all permanently to the filaments when the ratio of abrasive particle size to the diameter of the filament exceeds certain limits since such particles will then obviously be relatively easily dislodged.

When the brushing characteristics of a short trim brush are desired and the same are obtained by utilizing bristles which extend but a short distance from the brush back or retaining element, the brush will ordinarily be relatively short-lived and must be discarded after the bristles have worn back to but a small extent.

To the manufacture of cards for use in the textile industry where a combing action is desired, wire teeth are commonly mounted in various patterns in cloth. For some operations such construction is still very satisfactory. However, demand for greater speeds and improved action affords an apportunity for the introduction of a novel improved carding device.

In the manufacture of twisted stem brushes and the like, where a layer of bristles is gripped between two opposed wires or like retaining elements, there has been a tendency for the bristles gradually to work loose and be lost from the brush. Moreover, stresses resulting from flexing of the bristles in use have been concentrated in the very narrow regions where such bristles are gripped between the retaining elements with early fracture and loss consequently resulting. Difficulty has also been encountered in obtaining a sufficiently even fill in the case of such brushes, particularly where a relatively thin layer of bristle material is utilized.

It is accordingly a primary object of this invention to provide filamentous brush bristle material which has been preliminarily arranged and bonded together to facilitate its assembly into brush strip as taught in my prior Patent No. 2,303,386, for example, and other bristle supporting means.

Another object is to provide such novel brush material in which the component filaments or strands are arranged in a uniformly oriented manner, both as to spacing and in the case of oval or flat wire as to the direction of their greater transverse sectional dimension.

Another object is to provide such brush material in which the end portions extend freely but in definitely oriented relationship from a thin flexible plastic body.

Another object is to provide brushes including rotary brushes of various types in which relatively flat units or layers of bonded together bristles or filaments are arranged for operation at the working face of the brush in a direction either edgewise or flatwise of such units as may be desired.

Another object is to provide such brush material units of bonded filaments in which such filaments are of greater transverse dimension in one direction than another, such as flat and oval wire, for example, and brushes utilizing the same, with such filaments oriented with their greater transverse dimensions extending in the same direction.

Another object is to provide such units and brushes utilizing the same having abrasive adhered or bonded thereto for effective application to the work.

Another object is to provide a method of bonding together parallel strands of brush material drawn from a continuous source of the same in a manner facilitating severing into proper units for assembly into brush strip and for other purposes.

Another object is to provide a novel card for use in the textile industry utilizing a modified form of my new brush material.

Another object is to provide a novel brush element in which the brush material is uniformly spaced in thin flexible groups in which the component filaments are arranged in a perfectly uniform manner.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a diagrammatic showing of a roll of my new brush material comprising a plurality of parallel strands bonded together by a suitable plastic;

Fig. 2 is an enlarged transverse sectional view of a strip of such material constituting one embodiment of my invention utilizing oval wires arranged with their greater transverse dimensions extending parallel to the width of the strip;

Fig. 3 is a view similar to Fig. 2 but in which the plastic bonding medium conforms more closely to the contours of the wires with a consequent increased tendency of the end portions of the latter at the working face of a brush to separate somewhat one from another;

Fig. 4 is a view similar to Fig. 3 but showing the employment of round wire or similar bristle material;

Fig. 5 is a view similar to Fig. 2 but with the component oval wires arranged with their greater cross-sectional dimensions extending transversely of the thickness of the assembled strip;

Fig. 6 is a view similar to Fig. 2 but showing the employment of flat rather than oval wire bonded together to form a unitary strip;

Fig. 7 is a semi-diagrammatic top plan view showing the manner in which my new brush material may be assembled into an elongated channelform back in the manufacture of brush strip;

Fig. 8 is a side elevational view corresponding to Fig. 7;

Fig. 9 is a perspective view of a rotary brush element comprising a plurality of helical turns of brush strip produced in accordance with Figs. 7 and 8;

Fig. 10 is a perspective view of a cup brush element formed of a single turn of such brush strip circularized about an axis generally parallel to the brushing units or fingers;

Fig. 11 illustrates another form of rotary brush utilizing the novel brush material of my invention in which lengths of such brush strip are mounted in the form of long lead helices upon a suitable rotatable support;

Fig. 12 illustrates yet another type of rotary brush utilizing brush material in accordance with my invention, such brush being adapted simultaneously to act upon both the sides and the end of a blind hole in a work-piece, for example;

Fig. 13 is a perspective view of a length of brush strip utilizing my new brush material which may be of the Fig. 4 type, for example, where the individual strands have separated slightly one from another in their outer end portions;

Fig. 14 is a perspective view of a length of brush strip utilizing brush material in accordance with my invention to which granular abrasive has been adhered;

Fig. 15 illustrates a double brushing unit or finger adapted to be secured in a channelform back in the manner illustrated in Fig. 7, for example;

Fig. 16 is a side elevational view of a length of brush strip utilizing the brush material of Fig. 15;

Fig. 17 is a sectional view taken on the line 17—17 on Fig. 16 through such brush strip;

Fig. 18 shows a portion of a continuous strip of brush material in which the parallel strands have been bonded together in spaced regions therealong for subsequent severing into units of the Fig. 15 type;

Fig. 19 illustrates a unit or double brushing finger somewhat similar to that of Fig. 15 but having a layer of fabric bonded to its central portion and granular abrasive adhered to the outer end portions where the individual strands are bonded together with a suitable plastic;

Fig. 20 illustrates another modification of such double brushing finger with the central portion bonded to a strip of fabric or the like but with the individual strands of brush material extending freely at the respective ends;

Fig. 21 illustrates another modifification of such double brushing finger wherein the individual strands are bonded together with a suitable plastic in their central region with spaced strips of fabric adhered thereto adjacent the respective ends and with the end portions of the individual strands extending freely beyond such fabric strips;

Fig. 22 illustrates yet another modification of such double brushing finger wherein the individual strands are joined together at two spaced points by plastic or fabric with both the end portions and the central portions of the strands left exposed;

Fig. 23 is a sectional view similar to Fig. 17 showing brush material of the Fig. 15 type but with the ends of the exposed strands (normally wires) bent or curved in the same direction for employment in a card; and Fig. 24 is an end elevational view of a typical card utilizing such modified brush material.

Now referring more particularly to the annexed drawing and especially Figs. 1–8 thereof, certain illustrative embodiments of my invention will first be described and explained. A plurality of continuous strands or filaments, commonly wire of from about .005 to .016 inch in thickness, may be arranged in parallel uniformly closely spaced relationship and bonded together with a continuous plastic coating to form a continuous unitary strip 1 from which units of desired length may be cut by severing along line A—A, for example. Ordinarily, the several strands of wire will first have been passed through an appropriate adhesive to facilitate the later bonding of the plastic thereto and the plastic such as nylon or a polyvinyl plastic will then be intruded between the wires and about them as by passing the band of wires through a die of appropriate shape. If the plastic is of the nylon type, it will thereupon promptly be chilled to set the same, and if the plastic is of the thermosetting type such as the polyvinyl plastics it will be heated for a brief period after leaving the die.

The resultant continuous strip 1 of my new brush material may be continuously drawn from a reel 2 of the same and cut into desired lengths to form the brushing units or double brushing fingers 3 which may thereupon be disposed transversely of a continuous metal strip 4 having teeth 5 punched therein in accordance with my Patent No. 2,303,386. Elongated retaining element 6 is disposed over such fingers longitudinally of strip 4 and such latter strip passed between appropriate squeeze rolls (not shown) to form the same into a channel-shaped back 7 with teeth 5 overlying wire 6 to secure the brush fingers 3 therein.

It will thus be seen that I have produced a novel brush element in the form of a brush strip from which the filaments or strands of brush material extend in thin flat units or fingers. Such fingers may be quite flexible transversely of the brush strip although, of course, considerably more rigid than the individual strands or filaments longitudinally of the strip. Where a softer brushing action is desired, the plastic may be removed from the end portions of the fingers as at 8 (Fig. 8) by subjecting such end portions to the action of a rotary brush, for example. Other methods of providing for individual action of the filament ends will be described below.

The association of the individual filaments into unitary bands or fingers by means of the thin plastic coating (ordinarily of a thickness ranging from approximately one-half the diameter of the individual filaments to equal to the diameter of such filaments) not only greatly facilitates the handling of such brush material and uniform distribution of the same in the brush back but also serves to protect such filaments and modify the brushing characteristics of the same. Thus, such filaments, if of metal wire, for example, are protected from corrosion, and concentrations of stress in use are reduced due to the damping action of the plastic material.

As a further protection against corrosion it has been found desirable to employ a practice of submerging the cut lengths of plastic coated wire filaments and the like in a penetrating protective liquid which is drawn into the minute capillary spaces which may and generally do develop at the interfaces of the filaments and the plastic. Such protective liquid is effectively held in such minute spaces and is effective in keeping out vapor and liquid which otherwise may penetrate an initiate corrosion and associated fatigue which promotese early fracture of the component wire at points near those of maximum stress in use. Though the plastic is in itself a great protection against corrosion and is effective to distribute stresses of operation over a greater length of bristle and by means of such effects greatly prolongs the useful brush life, the additional treatment of the penetrating protective liquid has been found on trial effective to double the life of a brush as compared to a similar one not so treated and operated under similar corrosive conditions. An example of such a penetrating liquid is one marketed under the trade name "Penetrol" by the Flood Co. of Hudson, Ohio. A mixture of soya bean oil, lanoline, and lacquer thinner (alcohol, benzol, and turpentine) has also proved effective but the use of volatile solvents should be kept at a minimum. A low viscosity, high surface tension, and rust-proofing properties are the qualities desired.

The action of the brush in use may be further modified by the employment of oval wire 9, for example, with the individual wires arranged in uniformly spaced side-by-side relationship with their greater cross-sectional dimensions extending transversely of the strip or band 1 and parallel to the flat surface of such strip as shown in Fig. 2. Conversely, such wires 9 may be arranged with their greater diameters extending normal to such surface as shown in Fig. 5. It is thus possible to maintain non-round filaments in different desired orientation relative to one another, and it is obvious that the strip of Fig. 2 will be more flexible than that of Fig. 5, for example, when utilizing the same size wire and thickness of coating material. Flat wire 10 may be similarly arranged as shown in Fig. 6.

It is sometimes desired to provide for a degree of extra flexibility and independent movement of the individual strands or filaments at the ends of the brushing units or fingers without, however, entirely stripping the protective plastic coating therefrom. As illustrated in Figs. 3 and 4, the plastic coating 11 may be caused to conform more closely to the contours of the wires 9 and 12, for example, so that the end portions of such wires may be more readily separated one from another as a result of impact and abrasion against the work in use. As shown in Fig. 13, such end portions 13 will tend to pull apart or separate in a somewhat irregular manner but with at least a portion of the plastic coating adhering to the individual strands. In contrast, the plastic coating or matrix 14 of the Fig. 2 and Fig. 5 embodiments will more firmly reinforce the component strands or filaments, and the ends of the brushing fingers will consequently wear back in a relatively uniform manner.

It is also sometimes desired to provide for endwise resilience of the flat unitary groups of bristles and for their mutual support, which two objectives may be accomplished by forming a wavy contour lengthwise the thin otherwise flat unitary multiple wire brush material band. Such waving has been satisfactorily accomplished by passing the band between cooperating gear-like tools having smooth rounded tooth ends.

As shown in Fig. 9 of the drawing, a length of brush strip 7 may be circularized to form a brush element comprising a plurality of helical turns with the brushing fingers 3 extending generally radially therefrom. When a very thin coating of a relatively weak plastic material is utilized to bond the component strands of the fingers together, such strands may become substantially entirely separated one from another when the brush is put into use, the plastic material serving only to facilitate the assembly of the brush material into the brush back. Similarly, such plastic material may be dissolved or otherwise removed where its presence is not desired in the finished article. Instead of forming the brush strip into a plurality of turns as shown in Fig. 9, a single turn may be employed to form an annular brush element with the brush material extending radially therefrom. Likewise, the brush strip 7 may be circularized as shown in Fig. 10 to form a cup brush wherein the brush material extends generally parallel to the axis of circularization.

Generally straight lengths of brush strip utilizing my new brush material may be mounted upon a suitable rotary support, in the embodiment illustrated a cylinder 15, as by inserting such strip in clips 16 welded to such cylinder. A hub or end plate 17 supports such cylinder for mounting upon an appropriate arbor and is provided with openings 18 for the inflow of air which will then escape through openings 19 in the cylinder during operation of the brush. While such lengths of brush strip 7 may be arranged parallel to the axis of the rotary support, it will ordinarily be preferred to mount the same thereon in the form of long lead helices (Fig. 11).

In Peterson and Charvat Patent No. 2,465,396 there is disclosed a novel brushing tool in which a layer of brush material may be retained between straight parallel stem members for brushing the inner walls of cylindrical openings and the like. It has always been a problem, however, to provide means whereby the end of a blind opening may be brushed simultaneously with the side walls thereof. In accordance with my present invention, I arrange a short length 20 of my new brush material comprising a plurality of parallel strands bonded together to form a relatively thin flat band transversely of a wire stem member with two narrower bands 21 and 22 of my new material superimposed thereon diagonally of such band 20 and projecting slightly beyond one side of the latter at spaced points, leaving an intermediate centrally disposed recess where such stem member may be rebent at 23 to grip the assembled brushing elements between straight parallel portions 24 and then twisted together as at 25 (or otherwise secured as by welding, etc.) to form the assembled brush. It will be understood that several layers of my new brush material 20, 21 and 22 may be superimposed as desired and that such layers will generally be preliminarily bonded together prior to doubling the wire thereabout. The end portions of bands 21 and 22 should project somewhat beyond the point of doubling 23 of the stem member so as to engage the work when inserted in a blind hole, for example. Stem 25 will generally be gripped in an appropriate drill chuck or the like for operation at high speeds. The doubled portions 24 of the wire stem member gripping the brush material will desirably be pressed together between appropriate dies under very high pressures which may be on the order of 10,000 to 20,000 pounds per square inch or more prior to securing such members together as by twisting.

While for purposes of simplicity, a single band or double finger has been shown as secured beneath wire 6 in brush strip back 7, it will be appreciated that as many layers as desired may thus be secured in the brush back.

Granular abrasive material such as Carborundum, emery, pumice, etc., may be bonded to the brushing fingers 3 as shown at 26 in Fig. 14 and will ordinarily extend from the ends of such fingers a little more than half-way toward the channelform back or other support in which such fingers are secured. Such fingers provide an ideal supporting surface for the abrasive to which the latter may be adhered or in which it may be embedded whereas, as above explained, it is very difficult satisfactorily to adhere such abrasive to individual brush bristles or filaments of small diameter. Not only is waste of abrasive avoided in contrast to the usual methods of application of abrasive using rotary brushes, but also such abrasive is supplied to the working ends of the bristles or filaments constituting the brush face in a manner for most effective application of such abrasive to the work.

It will be appreciated from the foregoing that a large number of modifications of my invention are possible and feasible although only certain illustrative embodiments are shown and described herein. Instead of forming a continuous plastic band 1 as shown in Fig. 1 with the filaments held in parallel relationship therein, such plastic may be applied to spaced regions as at 27 in Fig. 18 with the uncoated strands 28 exposed therebetween. By then severing the resulting strip along the lines B—B, double brushing fingers as shown in Fig. 15 are produced which may be secured in brush back 7 as shown in Figs. 7 and 8, for example, the free bristle ends 28 corresponding to the similar end portions 8 of Fig. 8 (and see Figs. 16 and 17).

In another embodiment illustrated in Fig. 19, a band of filaments is bonded together with plastic for its entire length as in the case of fingers 3, and abrasive 29 adhered to the respective end portions. Fabric 30 which may be of muslin or fiber glass, for example, is then adhered to the respective surfaces of the brushing unit overlying and protecting the abrasive embedded in the end portions of the latter. Such double brushing finger or unit will be utilized similarly to fingers 3 with its respective ends forming a portion of the brush face. While in the embodiments so far illustrated and described it is generally contemplated that double ended fingers will be utilized for securing in brush strip or the like with the respective ends extending from the brush back to form the working face of the brush, nevertheless it will be appreciated that such units may also be severed as along line C—C on Fig. 18 to provide individual brushing fingers which may be secured in various well-known ways to appropriate supports or brush backs.

The double brushing finger illustrated in Fig. 20 is generally similar to that of Fig. 15 but with a layer of fabric 31 bonded to one or both sides thereof, the brush material strands 28 extending free at the respective ends although, of course, maintained in oriented relationship.

The embodiment illustrated in Fig. 21 is similar to that of Fig. 20 except that two smaller spaced strips of fabric 32 and 33 are bonded to the finger on one or both sides thereof with the plastic coated region 34 exposed therebetween. The Fig. 22 embodiment resembles that of Fig. 21 except that the portions 35 of the strands or bristles intermediate the fabric strips 32 and 33 are wholly exposed similarly to the end portions 28.

Brush material of the type shown in Figs. 15, 20, 21 and 22 may be utilized in the production of cards for the textile industry as shown in Figs. 23 and 24. In this case the individual strands exposed at 28 will desirably be of spring steel with their ends 28' bent or curved in the same direction (Fig. 23). Brush strip 7 employing such brush material may then be mounted in a manner generally similar to that shown in Fig. 11 with all such curved ends 28' inclined in the direction of rotation. Alternatively, the brush strip may be mounted on a rotatable support but slightly inclined in the direction of rotation as shown in Fig. 24. Frequently it will be desirable to mount the parallel rows of brush strip in rather closer relationship than illustrated in either Fig. 11 or Fig. 24 when the bristle ends 28 are intended to afford a carding or combing action. It is particularly desirable that such bristles be reinforced with fabric such as 31, 32, and 33 when employed in cards in order better to resist the tendency to tear the plastic between the strands during operation.

It will be seen that the objects of my invention have been achieved by the provision of brush elements comprising one or more layers of strands or filaments bonded together by means of an appropriate synthetic plastic or equivalent. Suitable plastics for this purpose include nylon (polyamide resins), vinyl plastics (vinyl polymers and copolymers), and trifluorochloroethylene polymers. Neoprene (polychloroprene) and Hycar (modified copolymers of butadiene and acrylonitrile) as well as rubber and the melamine resins (melamine formaldehyde reaction products) may be employed in some cases, particularly when compounded to exhibit properties similar to those of nylon.

Typical examples of abrasives which may be adhered or embedded in such plastic (as in Figs. 14 and 19, for example) include:

Aluminum oxide ("Alundum," "Aloxite")
Silicon carbide ("Carborundum," "Corundum")
Chrome oxide
Natural abrasives (e.g. pumice, emery)
Various mixtures of the above The aluminum oxides are particularly suitable where good abrasive action combined with the production of a relatively good finish is desired. The silicon carbides make hard and sharp abrasives for maximum cutting action.

While my invention is particularly advantageously employed when utilizing brush material such as wire and synthetic plastic filaments which are available in continuous lengths, the naturally occurring brush materials such as Tampico fiber and horsehair may be utilized, as may also cord and like materials. As shown and described in my co-pending application Serial No. 58,670, filed November 6, 1948, now Patent No. 2,682,734, dated July 6, 1954, various individually plastic coated monofilaments and stranded materials make excellent brush bristles for certain purposes. Thus, for example, individually plastic coated steel wire, either straight or crimped, may be arranged in bands in accordance with the present invention and joined together with a thin layer of plastic throughout their length (Fig. 1) or at spaced intervals (Figs. 18, etc.) for severing into my new brush elements. Brush bristle material comprising a fiber glass core enclosed within an outer sheath or coating of flexible plastic material, as taught in my aforesaid Patent 2,682,734, may also be similarly utilized.

Individual strands or bristles of other than circular cross-section (e.g. Figs. 2, 3, 5 and 6) may be arranged in a manner to obtain the desired brushing characteristics and maintained in the selected orientation by means of the plastic film or coating joining the same together. Relatively hard brittle stranded materials having low damping capacity may be rendered usable in brushes by the employment of plastic material of high damping capacity.

Whether my new brush material is employed as a band of single strand thickness or in a brush element comprising many layers of such strands, the exact desired orientation and uniformity of spacing of the individual strands is readily obtained and maintained. While certain of the more important embodiments of my invention are illustrated and described above, it will nevertheless be appreciated that many other forms and modifications are possible within the principles of my invention.

The wire stem members of Fig. 12 will desirably be of half-round wire having a flat face engaging and gripping the brush material, thereby obtaining a particularly firm hold on the latter and permitting the imposition of high clamping pressures without danger of cutting the strands. The parallel strands or bristles joined together by the plastic in the various embodiments described need not be monofilaments but may also comprise stranded materials such as fine twisted wire or glass fibers. When such stranded materials are enclosed in individual plastic sheaths to form the brush bristles, the component filaments may lie parallel to one another with little or no twisting. Abrasive may be bonded to brush elements of the Fig. 12 type, for example, in the same general manner as in the case of the Fig. 14 embodiment, preferably by wetting such abrasive with the same plastic used to interconnect the bristle material.

In one sense certain forms of the new brush elements of this invention may be considered as relatively thin flat plastic fingers which are reinforced by the strands bonded thereto. Such strands serve both to render the fingers less flexible and also less subject to elongation in use. Plastic fingers such as those of Fig. 14, for example, tend to become much distorted and elongated in their end portions when not so reinforced, particularly when mounted in a high speed rotary brush. The plastic materials ordinarily employed in accordance with this invention are quite flexible and have high vibration damping ability. The flexibility of the flat brushing fingers will vary according to the type of bristle material incorporated therein as well as the quantity of such material. Very hard bristle material having a Knoop hardness of at least 600 and in some cases of 800 or more may be employed without excessive fracture of such relatively hard and brittle material due to the protection and damping action afforded by the plastic coating or layer. Glass fiber, hard steel wire, stainless steel wire, beryllium copper wire, and the like are thus suitable.

Other modes of applying the principle of the invention may be employed, change being made as regards the details described, provided the features stated in any of the following claims or the equivalent of such be employed.

I therefore particularly point out and distinctly claim as my invention:

1. As a new article of manufacture, a brush element comprising a channel-shaped back and a plurality of brushing fingers secured therein and extending therefrom, said fingers comprising parallel strands of brush material bonded together in a thin generally flat band of flexible plastic material, with the central portion of said band bent and secured in such channel and with the end portions thereof extending from such channel in generally parallel side-by-side relationship, said strands of brush material extending longitudinally of said fingers.

2. As a new article of manufacture, brush strip comprising an elongated metal channelform back, a plurality of brushing fingers secured therein, said fingers comprising a plurality of parallel strands of brush bristle material enclosed in a thin generally flat layer of flexible plastic with the central portion of each finger folded and lying within such channel with its respective end portions extending in generally parallel relationship therefrom, and an elongated retaining element within such channel overlying such folded portions of said fingers and securing said fingers in said back, said strands of brush material extending longitudinally of said fingers.

3. As a new article of manufacture, a brush element comprising a support and brush material secured thereto and extending therefrom, said brush material comprising a straight single row of uniformly spaced outwardly extending parallel strands of brush bristle material enclosed in a generally flat plastic band, such plastic coating said strands to a thickness approximately one-half the diameter of the individual strands and extending a substantial portion of the length of said strands freely projecting from said support.

4. As a new article of manufacture, a brush element comprising a support and brush material secured thereto and extending therefrom, said brush material comprising a straight single row of uniformly spaced side-by-side parallel strands of brush bristle material enclosed in a generally flat thin flexible plastic band extending substantially to the outer working ends of said strands, such thin plastic coating conforming generally to said parallel strands to provide grooves in the surface of the plastic band intermediate said strands facilitating subsequent separation of the strand end portions in use.

5. As a new article of manufacture, a brush element comprising a support and brush material secured thereto and extending therefrom, said brush material comprising a plurality of like outwardly extending parallel hard strands of non-uniform cross-section arranged with such cross-sections similarly oriented, and plastic material bonding said strands together effective to maintain such relative orientation.

6. As a new article of manufacture, a brush element comprising a support and brush material secured thereto and extending therefrom, said brush material comprising a plurality of like hard parallel strands of elongated cross-section arranged side-by-side in a row and oriented with their longer cross-sections extending in the same direction, and flexible plastic material bonding said strands together effective to maintain such orientation, said strands extending outwardly from said support.

7. As a new article of manufacture, a brush element comprising a support and brush material secured thereto and extending therefrom, said brush material comprising a straight single row of hard parallel strands of elongated cross-section arranged side-by-side and oriented with their longer cross-sections aligned, and a generally flat thin flexible plastic band enclosing and joining said strands to form brushing fingers maintaining such orientation with said strands extending outwardly from said support.

8. As a new article of manufacture, a brush element comprising a support and brush material secured thereto and extending therefrom, said brush material comprising a straight single row of hard parallel strands of elongated cross-section arranged side-by-side and oriented with their longer cross-sections extending transversely of said row, and a generally flat thin flexible plastic band enclosing and joining said strands to form brushing fingers maintaining such orientation with said strands extending outwardly from said support.

9. A rotary brush comprising a rotatable support and brush material secured thereto and extending generally radially therefrom, said brush material comprising a plurality of thin generally flat bands of flexible plastic and parallel stiff strands bonded together by such plastic and extending longitudinally of said bands, and said bands extending individually radially of said support with said strands extending outwardly from said support.

10. A rotary brush bristle comprising a rotatable support and brush bristle material secured thereto and extending therefrom, said brush material comprising hard flexible strands of elongated cross-section arranged side-by-side and flexibly bonded together with their longer cross-sections oriented in the direction of rotation of said brush in use and with said strands extending outwardly from said support.

11. A brush element comprising a support and brush material secured thereto and extending therefrom, said brush material comprising a plurality of thin generally flat plastic fingers, longitudinally extending strands of reinforcing material embedded in such plastic and extending outwardly from said support, and granular abrasive bonded to said fingers, said plastic fingers being of greater length than width.

12. A brush element comprising a support and brush material secured thereto and extending therefrom, said brush material comprising a plurality of thin generally flat plastic fingers, longitudinally extending strands of fine bristle material embedded in close side-by-side relation in such plastic and extending outwardly from said support, and granular abrasive bonded to said fingers, said plastic fingers being of greater length than width.

13. A brush element comprising a support and brush material secured thereto and extending therefrom, said brush material comprising a plurality of individual thin generally flat flexible plastic fingers and bristle material embedded in such plastic and extending beyond the outer ends of said fingers, said fingers being elongated in the direction said bristle material extends and being individually flexible.

14. A brush element comprising a support and brush material secured thereto and extending therefrom, said brush material comprising a plurality of thin generally flat plastic fingers and a single row of bristles embedded in parallel side-by-side relationship in such plastic and extending beyond the outer ends of said fingers in uniformly spaced parallel relationship, said fingers being elongated in the direction said bristles extend and being individually flexible.

15. A brush element comprising a channel back, a plurality of thin generally flat plastic fingers folded transversely in their central regions with such folded central regions inserted within such channel and their respective end portions extending in general side-by-side relationship therefrom, an elongated retaining element extending longitudinally within such channel and overlying said fingers in such folded regions to secure them in such channel, and a flat band of brush bristle material embedded in such plastic and extending beyond the respective ends of said fingers.

16. A rotary brush adapted for use as a card or the like comprising a central support adapted for rotation about an axis, and brush material secured thereto and extending generally radially therefrom comprising a plurality of thin generally flat plastic fingers and a single row of parallel uniformly spaced bristles embedded in each said plastic finger and extending uniformly longitudinally beyond the outer end thereof, the planes of said fingers being generally parallel to such axis.

17. A rotary brush adapted for use as a card or the like comprising a central support adapted for rotation about an axis, and brush material secured thereto and extending generally radially therefrom comprising a plurality of thin generally flat plastic fingers and a single row of parallel uniformly spaced bristles embedded in each said plastic finger and extending uniformly longitudinally beyond the outer end thereof, the planes of said fingers being generally parallel to such axis, and a layer of fabric bonded to the end portion of each said plastic finger to prevent tearing of said fingers by said bristles in use.

18. A rotary brush adapted for use as a card or the like comprising a central support adapted for rotation about an axis, and brush material secured thereto and extending generally radially therefrom comprising a plurality of thin generally flat plastic fingers, a single row of parallel uniformly spaced wire bristles embedded side-by-side in each said plastic finger and extending uniformly longitudinally beyond the outer ends thereof, the planes of said fingers being generally parallel to such axis and the extreme end portions of said wire bristles being bent in the direction of rotation of said support, and layers of reinforcing fabric bonded to the respective sides of each said finger to prevent tearing of said fingers by said bristles in use.

19. The method of making a brush element which comprises arranging a plurality of strands in parallel relationship to form a flat elongated band, bonding such strands together with plastic in longitudinally spaced regions of substantial extent longitudinally of such strands, severing such strands where exposed intermediate such regions to form double brushing fingers having such exposed strands extending from each end, doubling such fingers transversely midway of their length, and securing such fingers in the region of doubling in a channel support with their end portions extending in side-by-side relationship.

20. The method of making a brush element which comprises arranging a plurality of strands in parallel relationship to form an elongated flat band one strand in thickness, bonding such strands together in longitudinally spaced regions, adhering reinforcing fabric to such regions, severing such band into flat brushing fingers comprising a bonded fabric-reinforced portion with exposed unbonded strands extending therefrom, and securing such bonded portions of such fingers to a back member with such bonded portions extending flexibly from the latter and such exposed strands comprising the brush face.

21. The method of making a brush element which comprises arranging a plurality of strands in parallel relationship to form an elongated band, bonding such strands together in longitudinally spaced regions, severing such band into sections comprising a bonded portion with unbonded strands extending therefrom, and securing such bonded portions to a support with such bonded portions extending flexibly from the latter and such unbonded strand portions forming the brush face.

22. A rotary brush comprising a rotatable support and brush material secured thereto and extending flexibly therefrom, said brush material comprising a plurality of individual thin flat flexible plastic fingers and a flat layer of longitudinally extending bristles embedded in each said finger, said fingers being arranged with their longer cross-sections extending in the direction of rotation of said brush in use.

23. A rotary brush comprising a rotatable support and brush material secured thereto and extending flexibly therefrom, said brush material comprising individually flexibly extending elongated thin flat flexible plastic fingers and a flat layer of longitudinally extending bristles embedded in each said finger, said fingers being arranged with their longer cross-sections extending transversely of the direction of rotation of said brush in use.

24. A brushing tool comprising a support and brush material secured thereto and extending therefrom, said brush material comprising generally flat thin plastic fingers of resilient, high damping capacity flexible plastic, and a plurality of parallel strands having a Knoop hardness of at least 600 embedded in said fingers longitudinally thereof.

25. As a new article of manufacture, novel brush material comprising a plurality of mono-filaments bonded together in parallel oriented spaced relationship in a thin wavy band of flexible plastic material, the hollows of such waves lying between adjacent filaments.

26. A brush comprising a back and brush material extending therefrom, said brush material comprising small parallel bundles of filaments having a Knoop hardness of at least 600, said bundles being joined together in laterally spaced relationship by an outer sheath of resilient high damping capacity flexible plastic in the form of substantially flat brushing fingers with said bundles extending longitudinally outwardly from said back.

27. The brush of claim 26 wherein said filaments are wires.

28. The brush of claim 26 wherein said filaments are glass fibers.

References Cited in the file of this patent

UNITED STATES PATENTS

| | | |
|---|---|---|
| 518,168 | Walls | Apr. 10, 1894 |
| 864,922 | Saltiel | Sept. 3, 1903 |
| 1,608,102 | Jury | Nov. 23, 1926 |
| 1,915,057 | Foss | June 20, 1933 |
| 1,970,302 | Gehardt | Aug. 14, 1934 |
| 1,992,665 | Hazell | Feb. 26, 1935 |
| 2,093,198 | Kleinmann | Sept. 14, 1937 |
| 2,100,138 | Heldt | Nov. 23, 1937 |
| 2,179,454 | Paulus | Nov. 7, 1939 |
| 2,190,182 | Beames | Feb. 13, 1940 |
| 2,294,480 | Rohweder et al. | Sept. 1, 1942 |
| 2,310,186 | Abrams | Feb. 2, 1943 |
| 2,363,685 | Neuschaefer | Nov. 28, 1944 |
| 2,600,143 | Vaughn | June 10, 1952 |
| 2,605,201 | Howe | July 29, 1952 |
| 2,648,084 | Swart | Aug. 11, 1953 |
| 2,682,734 | Peterson | July 6, 1954 |

FOREIGN PATENTS

| | | |
|---|---|---|
| 490,124 | Great Britain | Aug. 9, 1938 |